US012020535B2

(12) United States Patent
Huke et al.

(10) Patent No.: US 12,020,535 B2
(45) Date of Patent: Jun. 25, 2024

(54) SYSTEM FOR CALCULATING AND STORING THE ODDS DATA ON A FIRST WAGERING NETWORK AND ADJUSTING ODDS ON A SECOND WAGERING NETWORK BASED ON THE ODDS DATA FROM THE FIRST WAGERING NETWORK

(71) Applicant: AdrenalineIP, Washington, DC (US)

(72) Inventors: Casey Alexander Huke, Washington, DC (US); John Cronin, Jericho, VT (US); Joseph W. Beyers, Saratoga, CA (US); Michael D'Andrea, Burlington, VT (US)

(73) Assignee: AdrenalineIP, Washington, DC (US)

( * ) Notice: Subject to any disclaimer, the term of this patent is extended or adjusted under 35 U.S.C. 154(b) by 0 days.

(21) Appl. No.: 17/493,031

(22) Filed: Oct. 4, 2021

(65) Prior Publication Data

US 2022/0198871 A1 Jun. 23, 2022

Related U.S. Application Data

(60) Provisional application No. 63/126,713, filed on Dec. 17, 2020.

(51) Int. Cl.

*A63F 9/24* (2006.01)
*A63F 11/00* (2006.01)
*G06F 13/00* (2006.01)
*G06F 17/00* (2019.01)
*G06Q 50/34* (2012.01)
*G07F 17/32* (2006.01)

(52) U.S. Cl.

CPC ........... *G07F 17/323* (2013.01); *G06Q 50/34* (2013.01); *G07F 17/3237* (2013.01); *G07F 17/3288* (2013.01)

(58) Field of Classification Search

CPC ............................. G07F 17/32; G07F 17/3211
USPC .............................. 463/1, 20, 22, 25, 30, 39
See application file for complete search history.

(56) References Cited

U.S. PATENT DOCUMENTS

| | | | | |
|---|---|---|---|---|
| 6,471,207 B1 * | 10/2002 | Schlaifer | A63F 3/00157 273/287 |
| 8,540,248 B2 * | 9/2013 | Golden | A63F 3/00157 273/274 |
| 2015/0364010 A1 * | 12/2015 | Marantelli | G07F 17/3276 463/26 |

* cited by examiner

*Primary Examiner* — Adetokunbo O Torimiro
(74) *Attorney, Agent, or Firm* — Maier & Maier, PLLC

(57) ABSTRACT

The present disclosure provides a system for using the odds data from a first wagering network to calculate and adjust wager odds for a second wagering network by receiving the odds data from the first wagering network, such as how many wagers placed, how many users on the wagering market, how much money was wagered and adjusting the odds of an upcoming wager market on a second wagering network depending on the odds data received from the first wagering network.

10 Claims, 3 Drawing Sheets

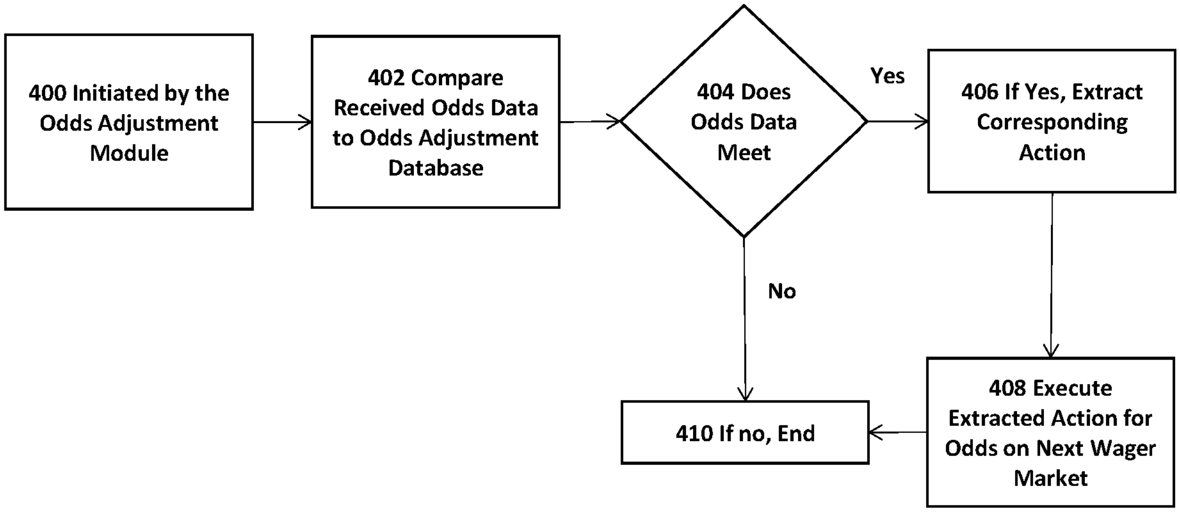

Fig. 4

Figure 1:
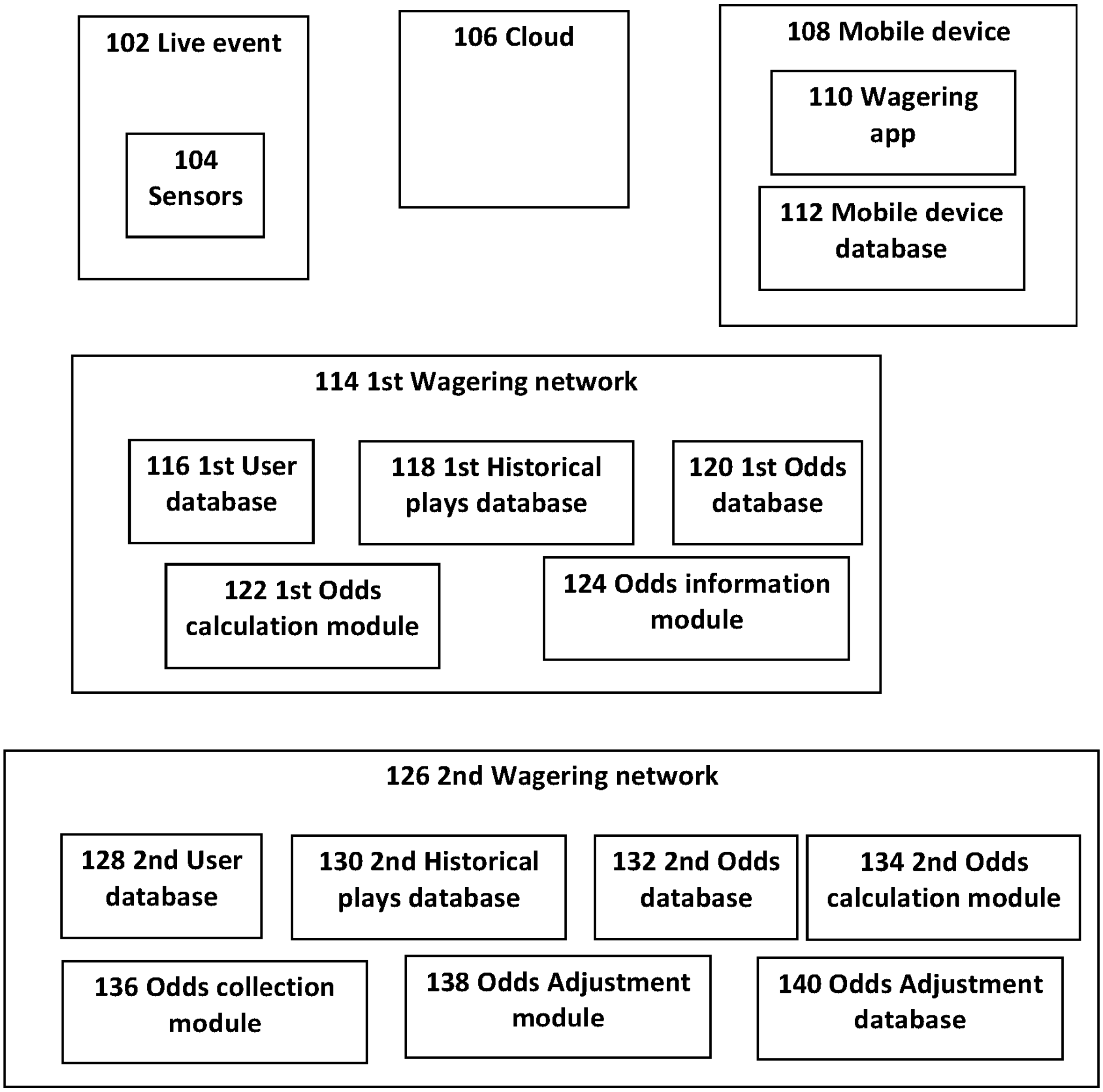

| Threshold | Action | Data |
|---|---|---|
| >1,000 Wagers Placed on Previous Wager Market | Decrease Odds on Next Wager Market by 10% | 10%Decrease.Data |
| >500 Users Placed Wagers on Previous Wager Market | Decrease Odds on Next Wager Market by 10% | 10%Decrease.Data |
| <200 Wagers Placed on Previous Wager Market | Increase Odds on Next Wager Market by 10% | 10%Increase.Data |
| <100 Users Placed Wagers on Previous Wager Market | Increase Odds on Next Wager Market by 10% | 10%Increase.Data |
| - | - | - |
| - | - | - |
| - | - | - |

Fig. 5

SYSTEM FOR CALCULATING AND STORING THE ODDS DATA ON A FIRST WAGERING NETWORK AND ADJUSTING ODDS ON A SECOND WAGERING NETWORK BASED ON THE ODDS DATA FROM THE FIRST WAGERING NETWORK

FIELD

The present disclosures are generally related to play-by-play wagering on live sporting events.

BACKGROUND

Currently, an issue with wagering platforms and applications is that they do not incorporate data from other wagering platforms or applications.

Also, wagering platforms do not adjust odds based on the number of users currently using a wagering application.

Lastly, wagering platforms do not try to target users by adjusting odds based on how many users are currently using a wagering application.

Thus, there is a need in the prior art to use data on a first wagering network and adjust odds on a second wagering network based on the odds data of the first wagering network.

SUMMARY

In one embodiment, a method for calculating and storing the odds data on a first wagering network and adjusting odds on a second wagering network based on the odds data from the first wagering network can include initiating an odds information module to extract and send odds data from an odds database to an odds collection module; connecting the odds collection module to the first wagering network to receive odds data from the odds information module; initiating an odds adjustment module to determine if the received odds data of the first wagering network exceed predetermined thresholds in an odds adjustment database; storing odds data from a first wagering network in at least one odds database; housing at least one threshold to compare odds data with, action to take if the threshold is exceeded or not met, and a data file to run if required by the action in an odds adjustment database; and executing an action to run a data file from the odds adjustment database to alter the odds on the second wagering network.

In another embodiment, a system for calculating and storing the odds data on a first wagering network and adjusting odds on a second wagering network based on the odds data from the first wagering network can include a first wagering network configured to calculate and store odds in a database; a second wagering network configured to communicate with the first wagering network; an odds information module configured to receive requests and send data to at least one odds collection module; an odds collection module configured to request and receive data from the odds information module; an odds adjustment module configured to increase or decrease odds on the second wagering network based on data received from the odds collection module; an odds database configured to store at least odds data; and an odds adjustment database configured to store at least one threshold, action, and data file.

BRIEF DESCRIPTIONS OF THE DRAWINGS

The accompanying drawings illustrate various embodiments of systems, methods, and various other aspects of the embodiments. Any person with ordinary skill in the art will appreciate that the illustrated element boundaries (e.g., boxes, groups of boxes, or other shapes) in the figures represent an example of the boundaries. It may be understood that, in some examples, one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 1: illustrates a system for calculating and storing the odds data on a first wagering network and adjusting odds on a second wagering network based on the odds data from the first wagering network, according to an embodiment.

Figure 2:
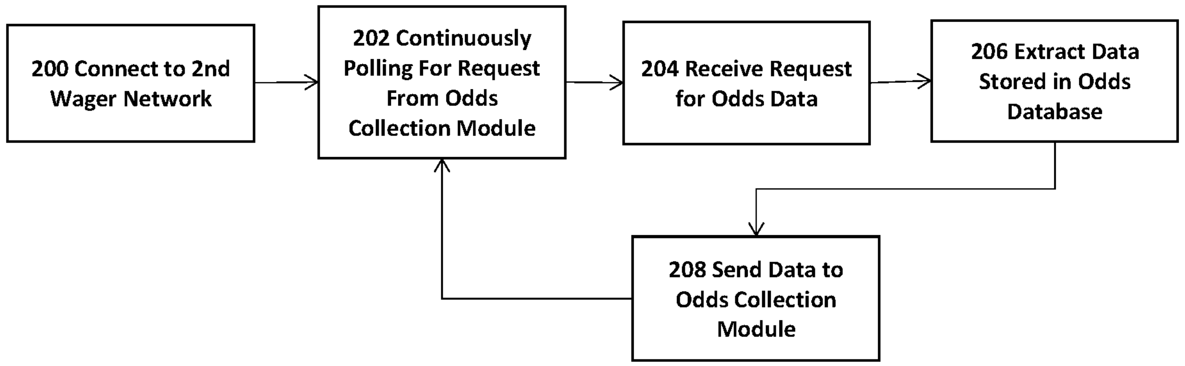

FIG. 2: illustrates an odds information module, according to an embodiment.

Figure 3:
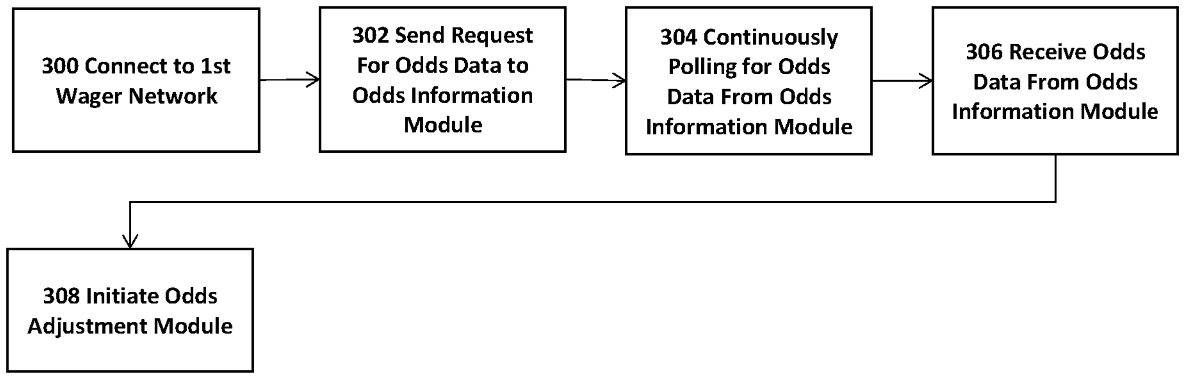

FIG. 3: illustrates an odds collection module, according to an embodiment.

FIG. 4: illustrates an odds adjustment module, according to an embodiment.

FIG. 5: illustrates an odds adjustment database, according to an embodiment.

DETAILED DESCRIPTION

Aspects of the present invention are disclosed in the following description and related figures directed to specific embodiments of the invention. Those of ordinary skill in the art will recognize that alternate embodiments may be devised without departing from the spirit or the scope of the claims. Additionally, well-known elements of exemplary embodiments of the invention will not be described in detail or will be omitted so as not to obscure the relevant details of the invention.

As used herein, the word exemplary means serving as an example, instance or illustration. The embodiments described herein are not limiting, but rather are exemplary only. The described embodiments are not necessarily to be construed as preferred or advantageous over other embodiments. Moreover, the terms embodiments of the invention, embodiments, or invention do not require that all embodiments of the invention include the discussed feature, advantage, or mode of operation.

Further, many of the embodiments described herein are described in terms of sequences of actions to be performed by, for example, elements of a computing device. It should be recognized by those skilled in the art that specific circuits can perform the various sequence of actions described herein (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in several different forms, all of which have been contemplated to be within the scope of the claimed subject matter. In addition, for each of the embodiments described herein, the corresponding form of any such embodiments may be described herein as, for example, a computer configured to perform the described action.

With respect to the embodiments, a summary of the terminology used herein is provided.

An action refers to a specific play or specific movement in a sporting event. For example, an action may determine which players were involved during a sporting event. In some embodiments, an action may be a throw, shot, pass, swing, kick, and/or hit performed by a participant in a sporting event. In some embodiments, an action may be a strategic decision made by a participant in the sporting event, such as a player, coach, management, etc. In some embodiments, an action may be a penalty, foul, or other type of infraction occurring in a sporting event. In some embodiments, an action may include the participants of the sporting event. In some embodiments, an action may include beginning events of sporting event, for example opening tips, coin flips, opening pitch, national anthem singers, etc. In some embodiments, a sporting event may be football, hockey, basketball, baseball, golf, tennis, soccer, cricket, rugby, MMA, boxing, swimming, skiing, snowboarding, horse racing, car racing, boat racing, cycling, wrestling, Olympic sport, eSports, etc. Actions can be integrated into the embodiments in a variety of manners.

A "bet" or "wager" is to risk something, usually a sum of money, against someone else's or an entity based on the outcome of a future event, such as the results of a game or event. It may be understood that non-monetary items may be the subject of a "bet" or "wager" as well, such as points or anything else that can be quantified for a "bet" or "wager." A bettor refers to a person who bets or wagers. A bettor may also be referred to as a user, client, or participant throughout the present invention. A "bet" or "wager" could be made for obtaining or risking a coupon or some enhancements to the sporting event, such as better seats, VIP treatment, etc. A "bet" or "wager" can be made for certain amount or for a future time. A "bet" or "wager" can be made for being able to answer a question correctly. A "bet" or "wager" can be made within a certain period. A "bet" or "wager" can be integrated into the embodiments in a variety of manners.

A "book" or "sportsbook" refers to a physical establishment that accepts bets on the outcome of sporting events. A "book" or "sportsbook" system enables a human working with a computer to interact, according to set of both implicit and explicit rules, in an electronically powered domain to place bets on the outcome of sporting event. An added game refers to an event not part of the typical menu of wagering offerings, often posted as an accommodation to patrons. A "book" or "sportsbook" can be integrated into the embodiments in a variety of manners.

To "buy points" means a player pays an additional price (more money) to receive a half-point or more in the player's favor on a point spread game. Buying points means you can move a point spread, for example, up to two points in your favor. "Buy points" can be integrated into the embodiments in a variety of manners.

The "price" refers to the odds or point spread of an event. To "take the price" means betting the underdog and receiving its advantage in the point spread. "Price" can be integrated into the embodiments in a variety of manners.

"No action" means a wager in which no money is lost or won, and the original bet amount is refunded. "No action" can be integrated into the embodiments in a variety of manners.

The "sides" are the two teams or individuals participating in an event: the underdog and the favorite. The term "favorite" refers to the team considered most likely to win an event or game. The "chalk" refers to a favorite, usually a heavy favorite. Bettors who like to bet big favorites are referred to "chalk eaters" (often a derogatory term). An event or game in which the sportsbook has reduced its betting limits, usually because of weather or the uncertain status of injured players, is referred to as a "circled game." "Laying the points or price" means betting the favorite by giving up points. The term "dog" or "underdog" refers to the team perceived to be most likely to lose an event or game. A "longshot" also refers to a team perceived to be unlikely to win an event or game. "Sides," "favorite," "chalk," "circled game," "laying the points price," "dog," and "underdog" can be integrated into the embodiments in a variety of manners.

The "money line" refers to the odds expressed in terms of money. With money odds, whenever there is a minus (−), the player "lays" or is "laying" that amount to win (for example, $100); where there is a plus (+), the player wins that amount for every $100 wagered. A "straight bet" refers to an individual wager on a game or event that will be determined by a point spread or money line. The term "straight-up" means winning the game without any regard to the "point spread," a "money-line" bet. "Money line," "straight bet," and "straight-up" can be integrated into the embodiments in a variety of manners.

The "line" refers to the current odds or point spread on a particular event or game. The "point spread" refers to the margin of points in which the favored team must win an event by to "cover the spread." To "cover" means winning by more than the "point spread." A handicap of the "point spread" value is given to the favorite team so bettors can choose sides at equal odds. "Cover the spread" means that a favorite wins an event with the handicap considered or the underdog wins with additional points. To "push" refers to when the event or game ends with no winner or loser for wagering purposes, a tie for wagering purposes. A "tie" is a wager in which no money is lost or won because the teams' scores were equal to the number of points in the given "point spread." The "opening line" means the earliest line posted for a particular sporting event or game. The term "pick" or "pick'em" refers to a game when neither team is favored in an event or game. "Line," "cover the spread," "cover," "tie," "pick," and "pick-em" can be integrated into the embodiments in a variety of manners.

To "middle" means to win both sides of a game; wagering on the "underdog" at one point spread and the favorite at a different point spread and winning both sides. For example, if the player bets the underdog +4½ and the favorite −3½ and the favorite wins by 4, the player has middled the book and won both bets. "Middle" can be integrated into the embodiments in a variety of manners.

Digital gaming refers to any type of electronic environment that can be controlled or manipulated by a human user for entertainment purposes. A system that enables a human and a computer to interact according to set of both implicit and explicit rules in an electronically powered domain for the purpose of recreation or instruction. "eSports" refers to a form of sports competition using video games, or a multiplayer video game played competitively for spectators, typically by professional gamers. Digital gaming and "eSports" can be integrated into the embodiments in a variety of manners.

The term event refers to a form of play, sport, contest, or game, especially one played according to rules and decided by skill, strength, or luck. In some embodiments, an event may be football, hockey, basketball, baseball, golf, tennis, soccer, cricket, rugby, MMA, boxing, swimming, skiing, snowboarding, horse racing, car racing, boat racing, cycling, wrestling, Olympic sport, etc. The event can be integrated into the embodiments in a variety of manners.

The "total" is the combined number of runs, points or goals scored by both teams during the game, including overtime. The "over" refers to a sports bet in which the player wagers that the combined point total of two teams will be more than a specified total. The "under" refers to bets that the total points scored by two teams will be less than a certain figure. "Total," "over," and "under" can be integrated into the embodiments in a variety of manners.

A parlay" is a single bet that links together two or more wagers; to win the bet, the player must win all the wagers in the "parlay." If the player loses one wager, the player loses the entire bet. However, if they win all the wagers in the "parlay," the player receives a higher payoff than if the player had placed the bets separately. A "round robin" is a series of parlays. A "teaser" is a type of parlay in which the point spread, or total of each individual play is adjusted. The price of moving the point spread (teasing) is lower payoff odds on winning wagers. "Parlay," "round robin," "teaser" can be integrated into the embodiments in a variety of manners.

A "prop bet" or "proposition bet" means a bet that focuses on the outcome of events within a given game. Props are often offered on marquee games of great interest. These include Sunday and Monday night pro football games, various high-profile college football games, major college bowl games, and playoff and championship games. An example of a prop bet is "Which team will score the first touchdown?" "Prop bet" or "proposition bet" can be integrated into the embodiments in a variety of manners.

A first-half bet" refers to a bet placed on the score in the first half of the event only and only considers the first half of the game or event. The process in which you go about placing this bet is the same process that you would use to place a full game bet, but as previously mentioned, only the first half is important to a first-half bet type of wager. A "half-time bet" refers to a bet placed on scoring in the second half of a game or event only. "First-half-bet" and "half-time-bet" can be integrated into the embodiments in a variety of manners.

A "futures bet" or "future" refers to the odds that are posted well in advance on the winner of major events. Typical future bets are the Pro Football Championship, Collegiate Football Championship, the Pro Basketball Championship, the Collegiate Basketball Championship, and the Pro Baseball Championship. "Futures bet" or "future" can be integrated into the embodiments in a variety of manners.

The "listed pitchers" is specific to a baseball bet placed only if both pitchers scheduled to start a game start. If they do not, the bet is deemed "no action" and refunded. The "run line" in baseball refers to a spread used instead of the money line. "Listed pitchers," "no action," and "run line" can be integrated into the embodiments in a variety of manners.

The term "handle" refers to the total amount of bets taken. The term "hold" refers to the percentage the house wins. The term "juice" refers to the bookmaker's commission, most commonly the 11 to 10 bettors lay on straight point spread wagers: also known as "vigorish" or "vig." The "limit" refers to the maximum amount accepted by the house before the odds and/or point spread are changed. "Off the board" refers to a game in which no bets are being accepted. "Handle," "juice," vigorish," "vig," and "off the board" can be integrated into the embodiments in a variety of manners.

"Casinos" are a public room or building where gambling games are played. "Racino" is a building complex or grounds having a racetrack and gambling facilities for playing slot machines, blackjack, roulette, etc. "Casino" and "Racino" can be integrated into the embodiments in a variety of manners.

Customers are companies, organizations, or individuals that would deploy, for fees, and may be part of, or perform, various system elements or method steps in the embodiments.

Managed service user interface service is a service that can help customers (1) manage third parties, (2) develop the web, (3) perform data analytics, (4) connect thru application program interfaces and (4) track and report on player behaviors. A managed service user interface can be integrated into the embodiments in a variety of manners.

Managed service risk management service are services that assist customers with (1) very important person management, (2) business intelligence, and (3) reporting. These managed service risk management services can be integrated into the embodiments in a variety of manners.

Managed service compliance service is a service that helps customers manage (1) integrity monitoring, (2) play safety, (3) responsible gambling, and (4) customer service assistance. These managed service compliance services can be integrated into the embodiments in a variety of manners.

Managed service pricing and trading service is a service that helps customers with (1) official data feeds, (2) data visualization, and (3) land based on property digital signage. These managed service pricing and trading services can be integrated into the embodiments in a variety of manners.

Managed service and technology platforms are services that help customers with (1) web hosting, (2) IT support, and (3) player account platform support. These managed service and technology platform services can be integrated into the embodiments in a variety of manners.

Managed service and marketing support services are services that help customers (1) acquire and retain clients and users, (2) provide for bonusing options, and (3) develop press release content generation. These managed service and marketing support services can be integrated into the embodiments in a variety of manners.

Payment processing services are services that help customers with (1) account auditing and (2) withdrawal processing to meet standards for speed and accuracy. Further, these services can provide for integration of global and local payment methods. These payment processing services can be integrated into the embodiments in a variety of manners.

Engaging promotions allow customers to treat players to free bets, odds boosts, enhanced access, and flexible cash-back to boost lifetime value. Engaging promotions can be integrated into the embodiments in a variety of manners.

"Cash out" or "pay out" or "payout" allow customers to make available, on singles bets or accumulated bets with a partial cash out where each operator can control payouts by always managing commission and availability. The "cash out" or "pay out" or "payout" can be integrated into the embodiments in a variety of manners, including both monetary and non-monetary payouts, such as points, prizes, promotional or discount codes, and the like.

"Customized betting" allows customers to have tailored personalized betting experiences with sophisticated tracking and analysis of players' behavior. "Customized betting" can be integrated into the embodiments in a variety of manners.

Kiosks are devices that offer interactions with customers, clients, and users with a wide range of modular solutions for both retail and online sports gaming. Kiosks can be integrated into the embodiments in a variety of manners.

Business Applications are an integrated suite of tools for customers to manage the everyday activities that drive sales, profit, and growth by creating and delivering actionable insights on performance to help customers to manage the sports gaming. Business Applications can be integrated into the embodiments in a variety of manners.

State-based integration allows for a given sports gambling game to be modified by states in the United States or other countries, based upon the state the player is in, mobile phone, or other geolocation identification means. State-based integration can be integrated into the embodiments in a variety of manners.

Game Configurator allows for configuration of customer operators to have the opportunity to apply various chosen or newly created business rules on the game as well as to parametrize risk management. The Game Configurator can be integrated into the embodiments in a variety of manners.

"Fantasy sports connectors" are software connectors between method steps or system elements in the embodiments that can integrate fantasy sports. Fantasy sports allow a competition in which participants select imaginary teams from among the players in a league and score points according to the actual performance of their players. For example, if a player in fantasy sports is playing at a given real-time sport, odds could be changed in the real-time sports for that player.

Software as a service (or SaaS) is a software delivery and licensing method in which software is accessed online via a subscription rather than bought and installed on individual computers. Software as a service can be integrated into the embodiments in a variety of manners.

Synchronization of screens means synchronizing bets and results between devices, such as TV and mobile, PC, and wearables. Synchronization of screens can be integrated into the embodiments in a variety of manners.

Automatic content recognition (ACR) is an identification technology that recognizes content played on a media device or present in a media file. Devices containing ACR support enable users to quickly obtain additional information about the content they see without any user-based input or search efforts. A short media clip (audio, video, or both) is selected to start the recognition. This clip could be selected from within a media file or recorded by a device. Through algorithms such as fingerprinting, information from the actual perceptual content is taken and compared to a database of reference fingerprints, wherein each reference fingerprint corresponds with a known recorded work. A database may contain metadata about the work and associated information, including complementary media. If the media clip's fingerprint is matched, the identification software returns the corresponding metadata to the client application. For example, during an in-play sports game, a "fumble" could be recognized and at the time stamp of the event, metadata such as "fumble" could be displayed. Automatic content recognition (ACR) can be integrated into the embodiments in a variety of manners.

Joining social media means connecting an in-play sports game bet or result to a social media connection, such as a FACEBOOK® chat interaction. Joining social media can be integrated into the embodiments in a variety of manners.

Augmented reality means a technology that superimposes a computer-generated image on a user's view of the real world, thus providing a composite view. In an example of this invention, a real time view of the game can be seen and a "bet"—which is a computer-generated data point—is placed above the player that is bet on. Augmented reality can be integrated into the embodiments in a variety of manners.

Some embodiments of this disclosure, illustrating all its features, will now be discussed in detail. It can be understood that the embodiments are intended to be open-ended in that an item or items used in the embodiments is not meant to be an exhaustive listing of such item or items or meant to be limited to only the listed item or items.

It can be noted that as used herein and in the appended claims, the singular forms "a," "an," and "the" include plural references unless the context clearly dictates otherwise. Although any systems and methods similar or equivalent to those described herein can be used in the practice or testing of embodiments, only some exemplary systems and methods are now described.

FIG. 1 is a system for calculating and storing the odds data on a first wagering network and adjusting odds on a second wagering network based on the odds data from the first wagering network. This system may include a live event 102, for example, a sporting event such as a football, basketball, baseball, or hockey game, tennis match, golf tournament, eSports, or digital game, etc. The live event 102 may include some number of actions or plays, upon which a user, bettor, or customer can place a bet or wager, typically through an entity called a sportsbook. There are numerous types of wagers the bettor can make, including, but not limited to, a straight bet, a money line bet, or a bet with a point spread or line that the bettor's team would need to cover if the result of the game with the same as the point spread the user would not cover the spread, but instead the tie is called a push. If the user bets on the favorite, points are given to the opposing side, which is the underdog or longshot. Betting on all favorites is referred to as chalk and is typically applied to round-robin or other tournaments' styles. There are other types of wagers, including, but not limited to, parlays, teasers, and prop bets, which are added games that often allow the user to customize their betting by changing the odds and payouts received on a wager. Certain sportsbooks will allow the bettor to buy points which moves the point spread off the opening line. This increases the price of the bet, sometimes by increasing the juice, vig, or hold that the sportsbook takes. Another type of wager the bettor can make is an over/under, in which the user bets over or under a total for the live event 102, such as the score of an American football game or the run line in a baseball game, or a series of actions in the live event 102. Sportsbooks have several bets they can handle, limiting the number of wagers they can take on either side of a bet before they will move the line or odds off the opening line. Additionally, there are circumstances, such as an injury to an important player like a listed pitcher, in which a sportsbook, casino, or racino may take an available wager off the board. As the line moves, an opportunity may arise for a bettor to bet on both sides at different point spreads to middle, and win, both bets. Sportsbooks will often offer bets on portions of games, such as first-half bets and half-time bets. Additionally, the sportsbook can offer futures bets on live events in the future. Sportsbooks need to offer payment processing services to cash out customers which can be done at kiosks at the live event 102 or at another location.

Further, embodiments may include a plurality of sensors 104 that may be used such as motion, temperature, or humidity sensors, optical sensors, and cameras such as an RGB-D camera which is a digital camera capable of capturing color (RGB) and depth information for every pixel in an image, microphones, radiofrequency receivers, thermal imagers, radar devices, lidar devices, ultrasound devices, speakers, wearable devices, etc. Also, the plurality of sensors 104 may include but are not limited to, tracking devices, such as RFID tags, GPS chips, or other such devices embedded on uniforms, in equipment, in the field of play and boundaries of the field of play, or on other markers in the field of play. Imaging devices may also be used as tracking devices, such as player tracking, which provide statistical information through real-time X, Y positioning of players and X, Y, Z positioning of the ball.

Further, embodiments may include a cloud 106 or a communication network that may be a wired and/or wireless network. The communication network, if wireless, may be implemented using communication techniques such as visible light communication (VLC), worldwide interoperability for microwave access (WiMAX), long term evolution (LTE), wireless local area network (WLAN), infrared (IR) communication, public switched telephone network (PSTN), radio waves, or other communication techniques that are known in the art. The communication network may allow ubiquitous access to shared pools of configurable system resources and higher-level services that can be rapidly provisioned with minimal management effort, often over the internet, and relies on sharing resources to achieve coherence and economies of scale, like a public utility. In contrast, third-party clouds allow organizations to focus on their core businesses instead of expending resources on computer infrastructure and maintenance. The cloud 106 may be communicatively coupled to a 1st peer-to-peer wagering network 114, which may perform real-time analysis on the type of play and the result of the play. The cloud 106 may also be synchronized with game situational data such as the time of the game, the score, location on the field, weather conditions, and the like, which may affect the choice of play utilized. For example, in an exemplary embodiment, the cloud 106 may not receive data gathered from the sensors 104 and may, instead, receive data from an alternative data feed, such as Sports Radar®. This data may be compiled substantially immediately following the completion of any play and may be compared with a variety of team data and league data based on a variety of elements, including the current down, possession, score, time, team, and so forth, as described in various exemplary embodiments herein.

Further, embodiments may include a mobile device 108 such as a computing device, laptop, smartphone, tablet, computer, smart speaker, or I/O devices. I/O devices may be present in the computing device. Input devices may include but are not limited to, keyboards, mice, trackpads, trackballs, touchpads, touch mice, multi-touch touchpads and touch mice, microphones, multi-array microphones, drawing tablets, cameras, single-lens reflex cameras (SLRs), digital SLRs (DSLRs), complementary metal-oxide semiconductor (CMOS) sensors, accelerometers, IR optical sensors, pressure sensors, magnetometer sensors, angular rate sensors, depth sensors, proximity sensors, ambient light sensors, gyroscopic sensors, or other sensors. Output devices may include but are not limited to, video displays, graphical displays, speakers, headphones, inkjet printers, laser printers, or 3D printers. Devices may include, but are not limited to, a combination of multiple input or output devices such as, Microsoft KINECT, Nintendo Wii remote, Nintendo WII U GAMEPAD, or Apple iPhone. Some devices allow gesture recognition inputs by combining input and output devices. Other devices allow for facial recognition, which may be utilized as an input for different purposes such as authentication or other commands. Some devices provide for voice recognition and inputs including, but not limited to, Microsoft KINECT, SIRI for iPhone by Apple, Google Now, or Google Voice Search. Additional user devices have both input and output capabilities including but not limited to, haptic feedback devices, touchscreen displays, or multi-touch displays. Touchscreen, multi-touch displays, touchpads, touch mice, or other touch sensing devices may use different technologies to sense touch, including but not limited to, capacitive, surface capacitive, projected capacitive touch (PCT), in-cell capacitive, resistive, IR, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, but not limited to, pinch, spread, rotate, scroll, or other gestures. Some touchscreen devices, including but not limited to, Microsoft PIXELSENSE or Multi-Touch Collaboration Wall, may have larger surfaces, such as on a table-top or on a wall, and may also interact with other electronic devices. Some I/O devices, display devices, or groups of devices may be augmented reality devices. An I/O controller may control one or more I/O devices, such as a keyboard and a pointing device, or a mouse or optical pen. Furthermore, an I/O device may also contain storage and/or an installation medium for the computing device. In some embodiments, the computing device may include USB connections (not shown) to receive handheld USB storage devices. In further embodiments, an I/O device may be a bridge between the system bus and an external communication bus, e.g., USB, SCSI, FireWire, Ethernet, Gigabit Ethernet, Fiber Channel, or Thunderbolt buses. In some embodiments, the mobile device 108 could be an optional component and would be utilized in a situation where a paired wearable device employs the mobile device 108 for additional memory or computing power or connection to the internet.

Further, embodiments may include a wagering software application or a wagering app 110, which is a program that enables the user to place bets on individual plays in the live event 102, streams audio and video from the live event 102, and features the available wagers from the live event 102 on the mobile device 108. The wagering app 110 allows the user to interact with the 1st wagering network 114 to place bets and provide payment/receive funds based on wager outcomes.

Further, embodiments may include a mobile device database 112 that may store some or all the user's data, the live event 102, or the user's interaction with the 1st wagering network 114.

Further, embodiments may include the 1st wagering network 114, which may perform real-time analysis on the type of play and the result of a play or action. The 1st wagering network 114 (or the cloud 106) may also be synchronized with game situational data, such as the time of the game, the score, location on the field, weather conditions, and the like, which may affect the choice of play utilized. For example, in an exemplary embodiment, the 1st wagering network 114 may not receive data gathered from the sensors 104 and may, instead, receive data from an alternative data feed, such as SportsRadar®. This data may be provided substantially immediately following the completion of any play and may be compared with a variety of team data and league data based on a variety of elements, including the current down, possession, score, time, team, and so forth, as described in various exemplary embodiments herein. The 1st wagering network 114 can offer several SaaS managed services such as user interface service, risk management service, compliance, pricing and trading service, IT support of the technology platform, business applications, game configuration, state-based integration, fantasy sports connection, integration to allow the joining of social media, or marketing support services that can deliver engaging promotions to the user.

Further, embodiments may include a 1st user database 116, which may contain data relevant to all users of the 1st wagering network 114 and may include, but is not limited to, a user ID, a device identifier, a paired device identifier, wagering history, or wallet information for the user. The 1st user database 116 may also contain a list of user account records associated with respective user IDs. For example, a user account record may include, but is not limited to, information such as user interests, user personal details such as age, mobile number, etc., previously played sporting events, highest wager, favorite sporting event, or current user balance and standings. In addition, the 1st user database 116 may contain betting lines and search queries. The 1st user database 116 may be searched based on a search criterion received from the user. Each betting line may include but is not limited to, a plurality of betting attributes such as at least one of the following: the live event 102, a team, a player, an amount of wager, etc. The 1st user database 116 may include, but is not limited to, information related to all the users involved in the live event 102. In one exemplary embodiment, the 1st user database 116 may include information for generating a user authenticity report and a wagering verification report. Further, the 1st user database 116 may be used to store user statistics like, but not limited to, the retention period for a particular user, frequency of wagers placed by a particular user, the average amount of wager placed by each user, etc.

Further, embodiments may include a 1st historical plays database 118 that may contain play data for the type of sport being played in the live event 102. For example, in American Football, for optimal odds calculation, the historical play data may include metadata about the historical plays, such as time, location, weather, previous plays, opponent, physiological data, etc.

Further, embodiments may utilize a 1st odds database 120 that may contain the odds calculated by a 1st odds calculation module 122 to display the odds on the user's mobile device 108 and take bets from the user through the mobile device wagering app 110.

Further, embodiments may include the 1st odds calculation module 122, which utilizes historical play data to calculate odds for in-play wagers.

Further, embodiments may include an odds information module 124, which may begin with the odds information module 124 connecting to the 2nd wager network 126. First, the odds information module 124 may continuously poll for a request from the odds collection module 136 for the odds data stored in the odds database 120. The odds information module 124 may receive a request from the odds collection module 136 for the odds data stored in the 1st odds database 120. Next, the odds information module 124 may extract the odds data stored in the 1st odds database 120. For example, the data extracted from the odds database 120 may be the number of wagers placed on the previous wager market, such as 1,500 wagers, the amount of money wagered on the previous wager market, such as $25,000 wagered, how many users wagered on the previous wager market, such as 800 users wagered on the previous wager market. The odds information module 124 may send the extracted data from the 1st odds database 120 to the odds collection module 136, and the process may return to continuously poll for a request from the odds collection module 136.

Further, embodiments may include the 2nd wagering network 126, which may perform real-time analysis on the type of play and the result of a play or action. The 2nd wagering network 126 (or the cloud 106) may also be synchronized with game situational data, such as the time of the game, the score, location on the field, weather conditions, and the like, which may affect the choice of play utilized. For example, in an exemplary embodiment, the 2nd wagering network 126 may not receive data gathered from the sensors 104 and may, instead, receive data from an alternative data feed, such as SportsRadar®. This data may be provided substantially immediately following the completion of any play and may be compared with a variety of team data and league data based on a variety of elements, including the current down, possession, score, time, team, and so forth, as described in various exemplary embodiments herein. In addition, the 2nd wagering network 126 can offer several software as a service (SaaS) managed services such as user interface service, risk management service, compliance, pricing and trading service, IT support of the technology platform, business applications, game configuration, state-based integration, fantasy sports connection, integration to allow the joining of social media, or marketing support services that can deliver engaging promotions to the user.

Further, embodiments may include a 2nd user database 128, which may contain data relevant to all users of the 2nd wagering network 126 and may include, but is not limited to, a user ID, a device identifier, a paired device identifier, wagering history, or wallet information for the user. The 2nd user database 128 may also contain a list of user account records associated with respective user IDs. For example, a user account record may include, but is not limited to, information such as user interests, user personal details such as age, mobile number, etc., previously played sporting events, highest wager, favorite sporting event, or current user balance and standings. In addition, the 2nd user database 128 may contain betting lines and search queries. The 2nd user database 128 may be searched based on a search criterion received from the user. Each betting line may include, but is not limited to, a plurality of betting attributes such as at least one live event 102, team, player, amount of wager, etc. The 2nd user database 128 may include but is not limited to information related to all the users involved in the live event 102. In one exemplary embodiment, the 2nd user database 128 may include information for generating a user authenticity report and a wagering verification report. Further, the 2nd user database 128 may be used to store user statistics like, but not limited to, the retention period for a particular user, frequency of wagers placed by a particular user, the average amount of wager placed by each user, etc.

Further, embodiments may include a 2nd historical plays database 130 that may contain play data for the type of sport being played in the live event 102. For example, in American Football, for optimal odds calculation, the historical play data may include metadata about the historical plays, such as time, location, weather, previous plays, opponent, physiological data, etc. Further, embodiments may utilize a 2nd odds database 132 that may contain the odds calculated by a 2nd odds calculation module 134 to display the odds on the mobile device 108 of the user and take bets from the user through the mobile device wagering app 110.

Further, embodiments may include the 2nd odds calculation module 134, which may utilize historical play data to calculate odds for in-play wagers.

Further, embodiments may include an odds collection module 136, which may begin with the odds collection module 136 connecting to the 1st wager network 114. The odds collection module 136 may send a request for the odds data to the odds information module 124. Thus, the odds collection module 136 may continuously poll for the odds data from the odds information module 124. The odds collection module 136 may receive the odds data from the odds information module 124. For example, the data received may be the number of wagers placed on the previous wager market, such as 1,500 wagers, the amount of money wagered on the previous wager market, such as $25,000 wagered, how many users wagered on the previous wager market, such as 800 users that wagered on the previous wager market. The odds collection module 136 may initiate the odds adjustment module 138.

Further, embodiments may include an odds adjustment module 138, which may begin with the odds adjustment module 138 initiated by the odds collection module 136. The odds adjustment module 138 may compare the received odds data with the odds adjustment database 140. For example, the received odds data may be, 1,500 wagers with $25,000 wagered, and 800 users that wagered on the previous wager market. This data may be compared to the odds adjustment database 140, which may exceed a predetermined threshold of over 1,000 wagers placed on the previous wager market and over 500 users placing wagers on the previous wager market. The odds adjustment module 138 may determine if the received odds data meets any thresholds stored in the odds adjustment database 140. For example, the received odds data may be, 1,500 wagers with $25,000 wagered on the previous wager market, and 800 users that wagered on the previous wager market. This data may be compared to the odds adjustment database 140, which may exceed a predetermined threshold of over 1,000 wagers placed on the previous wager market and over 500 users placing wagers on the previous wager market. If the received odds data meets any of the thresholds stored in the odds adjustment database 140, then the odds adjustment module 138 may extract the corresponding action. For example, since the received odds data exceeded the threshold of over 1,000 wagers placed on the previous wager market, then the action may be to decrease the current or next wager market available odds by 10% to provide more even odds for the users. The odds adjustment module 138 may then extract data from the odds adjustment database 140, such as "10% Decrease.Data." The odds adjustment module 138 may execute the extracted action for the wager odds on the next available wager market. For example, the data in the odds adjustment database 140 may be extracted and executed, such as "10% Decrease.Data," which may be a program or software leveraged to identify the next available wager market and decrease the odds by 10%. For example, if the next wager market contained odds in the Boston Red Sox vs. New York Yankees, that the first pitch would be a strike at 2:1 odds, these odds may decrease by 10% to 1.8:1. If the received odds data do not meet any of the thresholds stored in the odds adjustment database 140 or after the extracted action is executed by the odds adjustment module 138, then the process may end.

Further, embodiments may include an odds adjustment database 140. The odds adjustment database 140 may contain the thresholds which may be compared to the received odds data, the action if the threshold is exceeded or not, and the data file that may contain an executable program to act. The odds adjustment database 140 may be used in the process described in the odds adjustment module 138, wherein the received odds data may be compared to the data stored in the odds adjustment database 140. In some embodiments, thresholds may be for different wager markets, such as from one wager in a play-by-play wagering system to another wager. Further still, the thresholds may be for different live events 102 of the same sport or different sports. In addition, in some embodiments, the actions may increase, decrease, or stay the same based on the number of wagers placed on the previous wagering market, how much money was wagered on the previous wagering market, how many users wagered on the previous wagering market, how many views the wagering market received or how many users looked at the wagering market on their device, how many clicks a wagering market received, etc.

FIG. 2 illustrates the odds information module 124. The process may begin with the odds information module 124 connecting, at step 200, to the 2nd wager network 126. Next, the odds information module 124 may continuously poll, at step 202, for a request from the odds collection module 136 for the odds data stored in the odds database 120. The odds information module 124 may receive, at step 204, a request from the odds collection module 136 for the odds data stored in the odds database 120. Next, the odds information module 124 may extract, at step 206, the odds data stored in the odds database 120. For example, the data extracted from the odds database 120 may be the number of wagers placed on the previous wager market, how much money was wagered on the previous wager market, how many users wagered on the previous wager market, such as there were 1,500 wagers on the previous wager market, there was $25,000 wagered on the previous wager market, and there were 800 users that wagered on the previous wager market. The odds information module 124 may send, at step 208, the extracted data from the odds database 120 to the odds collection module 136, and the process may return to step 202 to continuously poll for a request from the odds collection module 136.

FIG. 3 illustrates the odds collection module 136. The process may begin with the odds collection module 136 connecting, at step 300, to the 1st wager network 114. The odds collection module 136 may send, at step 302, a request for the odds data to the odds information module 124. Next, the odds collection module 136 may continuously poll, at step 304, for the odds data from the odds information module 124. The odds collection module 136 may receive, at step 306, the odds data from the odds information module 124. For example, the data received may be the number of wagers placed on the previous wager market, how much money was wagered on the previous wager market, how many users wagered on the previous wager market, such as there were 1,500 wagers on the previous wager market, there was $25,000 wagered on the previous wager market, and there were 800 users that wagered on the previous wager market. The odds collection module 136 may initiate, at step 308, the odds adjustment module 138.

FIG. 4 illustrates the odds adjustment module 138. The process may begin with the odds adjustment module 138 being initiated, at step 400, by the odds collection module 136. The odds adjustment module 138 may compare, at step 402, the received odds data to the odds adjustment database 140. For example, if the received odds data were 1,500 wagers with $25,000 wagered, and 800 users that wagered on the previous wager market, this data may be compared to the odds adjustment database 140, which may exceed the threshold of over 1,000 wagers placed on the previous wager market and over 500 users placing wagers on the previous wager market. The odds adjustment module 138 may determine, at step 404, if the received odds data meets any of the thresholds stored in the odds adjustment database 140. For example, if the received odds data were 1,500 wagers with $25,000 wagered, and 800 users that wagered on the previous wager market, this data may be compared to the odds adjustment database 140, which may exceed the threshold of over 1,000 wagers placed on the previous wager market and over 500 users placing wagers on the previous wager market. If the received odds data meets any of the thresholds stored in the odds adjustment database 140, then the odds adjustment module 138 may extract, at step 406, the corresponding action. Continuing with the prior example, since the received odds data exceeded the threshold of over 1,000 wagers placed on the previous wager market, then the action may be to decrease the current or next wager market available odds by 10% to provide more even odds for the users. The odds adjustment module 138 may extract the data from the odds adjustment database 140, such as "10% Decrease.Data." The odds adjustment module 138 may execute, at step 408, the extracted action for the wager odds on the next available wager market. For example, the data in the odds adjustment database 140 may be extracted and executed, such as "10% Decrease.Data," which may be a program or software utilized to identify the next available wager market and decrease the odds 10%. For example, if the next wager market contained odds in the game between the Boston Red Sox vs. New York Yankees, the odds that the first pitch would be a strike at 2:1 odds, these odds may decrease by 10% 1.8:1. If the received odds data does not meet any of the thresholds stored in the odds adjustment database 140 or after the extracted action is executed by the odds adjustment module 138, then the process may end at step 410.

FIG. 5 illustrates the odds adjustment database 140. The database may contain the thresholds in which the received odds data is compared, the action if the threshold is exceeded or is not reached, and the data file that may contain an executable program to act. This database may be used in the process described in the odds adjustment module 138, wherein received odds data may be compared to the data stored in the odds adjustment database 140. In some embodiments, the thresholds may be for different wager markets, such as from one wager in play-by-play wagering system to another wager, the thresholds may be for different live events 102 of the same sport or different sports. In addition, in some embodiments, the actions may increase, decrease, or stay the same based on the number of wagers placed on the previous wager market, how much money was wagered on the previous wagering market, how many users wagered on the previous wagering market, how many views the wagering market received or how many users looked at the wagering market on their device, how many clicks a wagering market received, etc.

The foregoing description and accompanying figures illustrate the principles, preferred embodiments, and modes of operation of the invention. However, the invention should not be construed as being limited to the embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

The invention claimed is:

1. A method for calculating and storing the odds data on a first wagering network and adjusting odds on a second wagering network, that is separate from and communicatively coupled to the first wagering network, based on the odds data from the first wagering network, comprising:

connecting an odds information module of the first wagering network to the second wagering network so as to extract and send odds data from an odds database of the first wagering network to an odds collection module of the second wagering network;

connecting the odds collection module of the second wagering network to the first wagering network so as to receive odds data from the odds information module of the first wagering network;

initiating, by the odds collection module, an odds adjustment module of the second wagering network to determine if the odds data received from the first wagering network exceed at least one predetermined threshold in an odds adjustment database of the second wagering network; and when the odds data received from the first wagering network exceed the at least one predetermined threshold in the odds adjustment database of the second wagering network, executing an action from the odds adjustment database of the second wagering network to alter the odds for subsequent wagers on the second wagering network.

2. The method of claim 1, wherein the at least one predetermined threshold comprises one or more predetermined amounts of wagers placed on a previous wager market of the second wagering network or a number of users that placed wagers on a previous wager market of the second wagering network.

3. The method of claim 1, wherein the action comprises increasing or decreasing odds on a next available wager market of the second wagering network.

4. A system for calculating and storing the odds data on a first wagering network and adjusting odds on a second wagering network based on the odds data from the first wagering network, comprising:

a first wagering network configured to calculate and store odds in a database;

a second wagering network separate from and communicatively coupled to the first wagering network;

an odds information module of the first wagering network configured to receive requests from and send data to at least one odds collection module of the second wagering network, the odds collection module configured to request and receive data from the odds information module of the first wagering network;

an odds adjustment module configured to increase or decrease odds on the second wagering network based on data received from the odds information module by the odds collection module; and an odds adjustment database configured to store at least one threshold and an action to be executed.

5. The system of claim 4, wherein the odds information module of the first wagering network is further configured to extract data from an odds database of the first wagering network to send to the odds collection module of the second wagering network.

6. The system of claim 5, wherein the data extracted and sent is at least one of an amount of wagers placed on the first wagering network, an amount of money wagers on the first wagering network, and a number of users that placed wagers on the first wagering network.

7. The system of claim 4, wherein the odds adjustment module of the second wagering network is further configured to compare data received from the first wagering network with at least one threshold in the odds adjustment database of the second wagering network.

8. The system of claim 7, wherein the at least one threshold is one or more of an amount of wagers placed on the second wagering network and an amount of users who placed wagers on the second wagering network.

9. The system of claim 4, wherein the action stored in the odds adjustment database of the second wagering network is to increase or decrease odds on the second wagering network by executing a data file.

10. The system of claim 9, wherein the data file is configured to be at least a program or software configured to identify the next available wager market and decrease or increase the odds.

* * * * *